Figure 1:
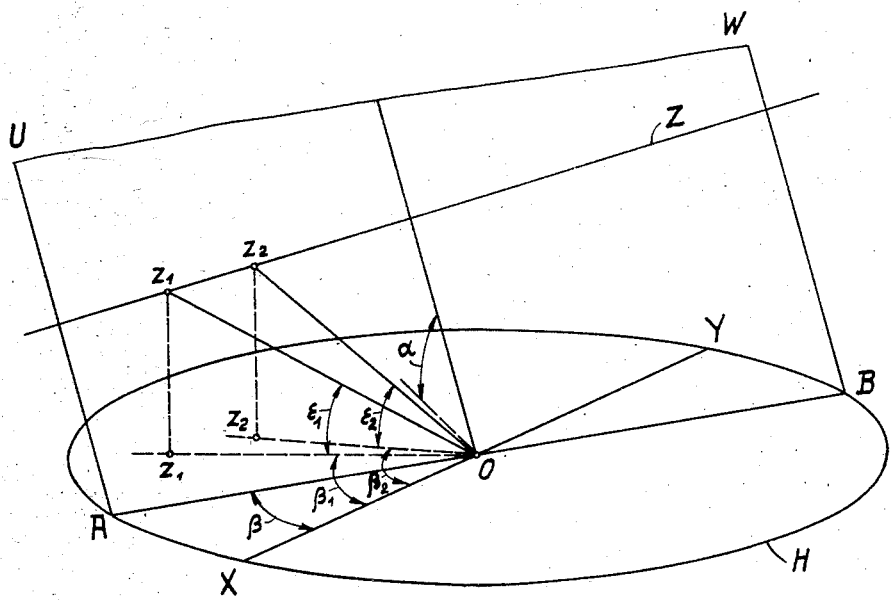

Sept. 2, 1930.  F. KALKNER  1,774,750
SEARCHLIGHT
Filed Nov. 11, 1929   2 Sheets-Sheet 1

Sept. 2, 1930.  F. KALKNER  1,774,750
SEARCHLIGHT
Filed Nov. 11, 1929  2 Sheets-Sheet 2

Inventor
Friedrich Kalkner
by Knight Bros
attorneys

Patented Sept. 2, 1930

1,774,750

UNITED STATES PATENT OFFICE

FRIEDRICH KALKNER, OF NUREMBERG, GERMANY, ASSIGNOR TO SIEMENS-SCHUCKERT-WERKE AKTIENGESELLSCHAFT, OF BERLIN-SIEMENSSTADT, GERMANY, A CORPORATION OF GERMANY

SEARCHLIGHT

Application filed November 11, 1929, Serial No. 406,285, and in Germany May 8, 1928.

My invention relates to searchlights, and more particularly to searchlights of the commercial form the main constituents of which are: a projector or drum which contains the lamp and the optical system, usually an arc-lamp and a parabolic reflector, a support upon which the projector is mounted so as to be capable of rotation around a horizontal axis, and a base-body upon which the support is mounted and which is adapted to revolve around a vertical axis.

The object of my invention is to provide a device which is to be applied to a searchlight to facilitate the attendance in cases in which the projector is to be moved in such a manner that the beam of light projected by it describes a plane (as generating line in the sense of geometry), which plane is not the horizontal or a vertical plane of the point at which the searchlight is mounted. Such a plane naturally always contains the point in which the apparatus is mounted, but otherwise it is capable of being inclined in relation to the horizontal plane of the mounting point under any angle between zero and 90 degrees and to intersect said horizontal plane in a straight line which is inclined under any angle to the meridian of the point of mounting.

The problem to which my invention relates and the means which I employ for solving this problem will be better understood with reference to the drawings affixed to my specification.

Figure 2:
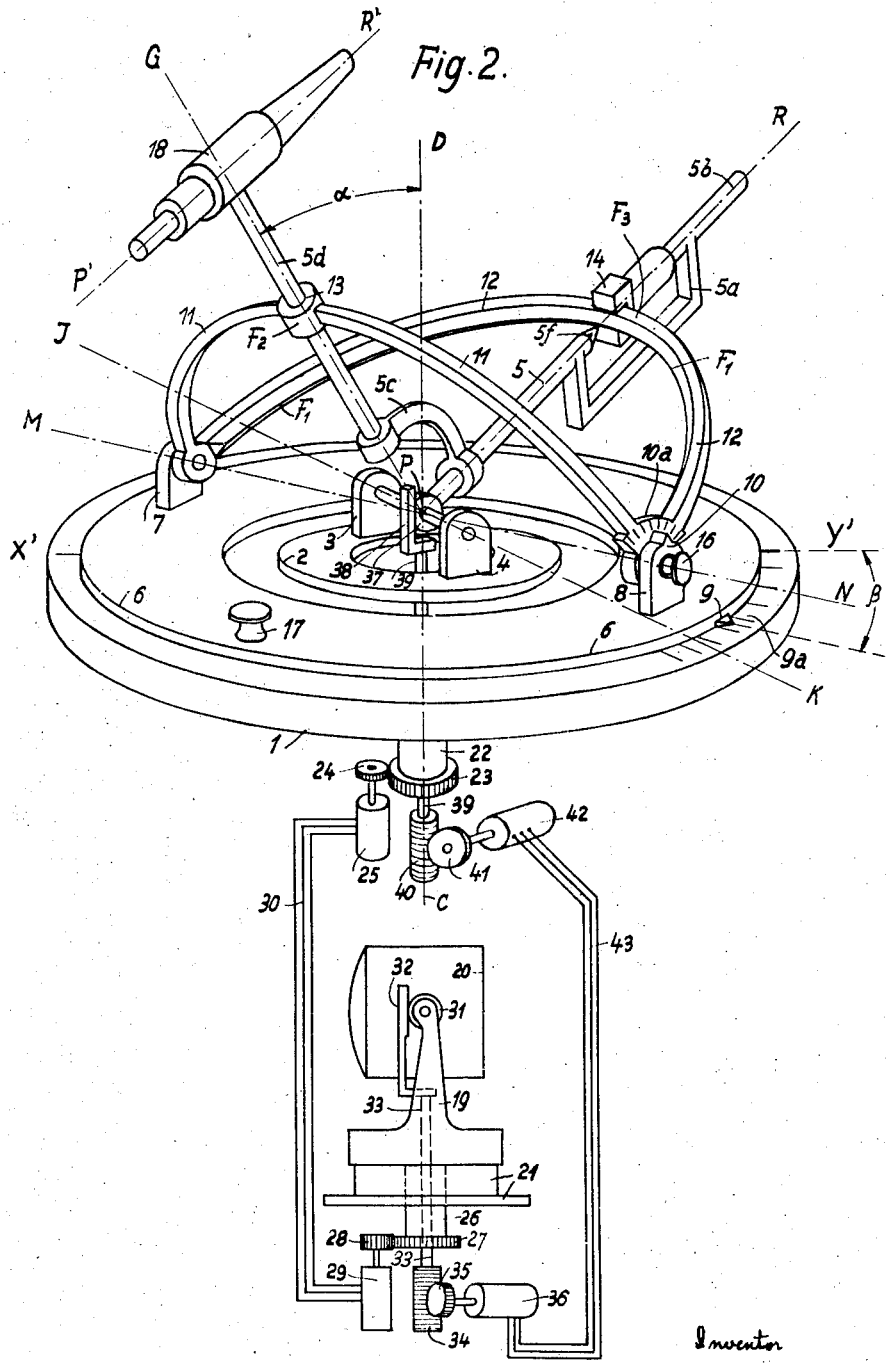

In the drawings shows:

Fig. 1, a perspective geometrical diagram of the horizontal plane of the point where the searchlight is mounted, also indicating certain directions in this plane and in the space above it and intended to demonstrate the geometrical principles underlying the problem of my invention, and Fig. 2, a perspective view of a device or apparatus constructed according to my invention, in which my invention is embodied in a plurality of modifications, and also illustrating in diagram the mode of connection between such a device and a searchlight.

Referring to Fig. 1 of the drawings, O is the point where the searchlight is mounted, H the horizon, and X, Y the meridian of this point. It is assumed that an airplane travelling over the horizon of the point O once has the position Z1 and later on the position Z2. By the aid of a listening appliance the direction OZ1 is first searched for and the two values ascertained which determine it viz, the angle $\epsilon_1$ by which the direction OZ1 rises above the horizontal plane and the angle $\beta_1$ between the meridian XY and the horizontal projection Oz1 of the direction OZ1. The angles $\epsilon_2$ and $\beta_2$ for the direction OZ2 are ascertained in the same manner.

By the directions OZ1 and OZ2 a plane is, however, determined. This plane represented by the square ABUW is inclined to the horizontal plane by the angle $\alpha$. It intersects the horizontal plane in the straight line AB which forms the angle $\beta$ with the meridian.

Assuming that the airplane continues to travel in a straight direction the path Z of the airplane will lie in the plane ABUW. The airplane will therefore be hit by the beam of light of the searchlight if the projector is moved in such a way that its optical axis which is also the longitudinal axis of the beam of light, describes the plane ABUW.

The device illustrated in Fig. 2 of the drawing comprises a base-plate 1 rigidly fixed upon a suitable support, not shown in the drawing. Upon the base-plate 1 is mounted the disc 2 in such a manner that it is capable of turning in relation to the base-plate around the axis CD. Upon the disc 2 is journaled the arm 5 in lugs 3, 4. The axis JK of the journal stands at right angles to the axis CD and intersects it in the point P. This arrangement of the base-plate 1, the disc 2 and the arm 5 will for the sake of brevity be hereafter referred to as the "arrangement in a cross-link-system." CD will be called the slewing axis, JK the tipping axis of the arm 5.

On the base-plate 1 a ring 6 is so mounted that it is able to turn in relation to the base-plate around the axis CD. This ring carries two lugs 7, 8 and a pointer 9 by means of which the position of the ring 6 can be checked or controlled on the scale 9$^a$, part of which only is shown in Fig. 2 of the drawing. In the lugs 7 and 8 is journaled a part which mainly consists of the two bows 11 and 12. The axis MN of the journal or pivot pin stands at right angles to the axis CD and intersects this axis in the point P. The base-plate 1, the ring 6 and the part 11, 12 are thus arranged in a second cross-link-system, universal or Cardan joint, the slewing axis and center of which coincide with the slewing axis and center of the first named cross-link-system.

The arm 5 is by means of a cranked part $5^a$, which passes through underneath the bow 12, provided with an extension $5^b$ located beyond this blow. With the arm 5 there is, furthermore, rigidly connected a shaft $5^d$ by a curved arm $5^c$. The connection of the arm 5 with the shaft $5^d$ which is to be considered as a portion of the arm 5 is such that the geometrical axis PG of the shaft $5^d$ in the center P stands at right angles to the tipping axis JK of the arm 5 and also at right angles to the axis PR which in the center P likewise stands at right angles to the tipping axis JK and may be described as the longitudinal axis of the arm 5.

The bow 11 carries at its crest a sleeve 13. This sleeve is provided with a cylindrical bore so that the axis PG of the shaft $5^d$ is also the axis of the cylindrical surface $F_2$ and as such stands in the center P also at right angles to the tipping axis MN of the part 11, 12. The shaft $5^d$ fits into the bore of the sleeve 13. The arm 5 and the parts connected with it are thus only able to rotate around the axis PG, and the longitudinal axis PR of the arm is obliged to describe a plane which stands at right angles to the axis PG.

The bow 12 is curved in a circle and its surface consists of zones of rotation surfaces the axis of rotation of which is the axis PG which in the center P stands at right angles to the tipping axis MN of the bow 12. The bow 12 is at its inner face provided with an edge F1 and the arm 5 terminates into a pointer $5^f$ facing the edge F1 and extending close up to it.

The extension $5^b$ of the arm 5 is provided with a claw 14 enclosing the bow from the circumference and contacting with the upper ring face F3 visible in Fig. 2 of the drawing and the under ring face of the bow 12 invisible in the drawing. During the rotation of the arm 5 compelled by the sleeve 13 and the shaft $5^d$ the claw 14 is able to slide freely along the bow 12 while the pointer $5^f$ of the arm 5 moves along the edge F1.

To attain the movement of the arm 5 during which the longitudinal axis PR of the arm describes a plane not all the parts shown in Fig. 2 of the drawing are necessary.

Thus the bow 12 may be omitted. The arm 5 is then guided by the shaft $5^d$ and the sleeve 13, the sleeve 13 being the guider and the wall of its bore, a zone of a cylindrical surface, the guiding-face.

It is also possible to omit the bow 11 with the sleeve 13. The bow 12 is then the guider. The upper ring face F3 and the lower (invisible) ring face together form the guiding-face for the claw 14, and the edge F1 forms the guiding-face for the pointer $5^f$ of the arm 5.

The claw 14 may likewise be omitted. The arm 5 must then be guided by an attendant who lays hold of the extension $5^b$ and watches the cooperation of the pointer $5^f$ and the edge F1.

Finally the parts $5^a$ and $5^b$ may be omitted and the arm 5 then becomes a simple pointer.

In Fig. 2 of the drawings a telescope is indicated at 18. This telescope is so fixed on the shaft $5^d$ that its optical axis P', R' is parallel to the longitudinal axis PR of the arm 5.

The ring 6 may be turned in relation to the base-plate 1 and after each adjustment be fixed in the new position on the base-plate by means of the clamping screw 17. On the base-plate there are at X' and Y' marked the points which correspond with the end points X and Y of the meridian in Fig. 1 of the drawing. If the tip of the pointer 9 is located below the tipping axis MN and the figures of the scale $9^a$ start at Y', as in Fig. 2 of the drawing, the pointer 9 must be set for the angle $\beta$ which the straight line AB in Fig. 1 forms with the meridian XY.

The bows 11, 12 may be turned around the tipping axis MN and after every rotation be secured in relation to the ring 6 by means of the clamping screw 16. By means of the pointer 10 and the scale $10^a$ the angle $\alpha$ is then to be set which in Fig. 1 the plane ABUW forms with the horizontal plane. This angle is in Fig. 2 drawn between the slewing axis CD and the axis PG of the guiding-faces F1, F2, F3. If pointer 10 and scale $10^a$ are so arranged that the pointer points at the zero division of the scale when the axis PG is made to coincide with the slewing axis CD and it is desired to set the device for a certain angle $\alpha$, the part 11, 12 is so adjusted that the pointer 10 indicates the angle in question on the scale $10^a$.

When using the device the disc 2 is coupled with the support 19 of the projector 20 in such a manner that the slewing angle of the disc 2, which is at the same time the slewing angle of the arm 5, referred to the base-plate 1 of the device is at all times equal to the slewing angle of the support 19 and the projector 20 referred to the base-body 21 of the searchlight.

The arm 5 is coupled with the projector 20 in such a manner that the tipping angle of the arm 5 referred to the base-plate 1 of the device is always equal to the tipping angle of the projector 20 referred to the base-body 21.

The construction of the coupling means is immaterial. In Fig. 2 of the drawings I have diagrammatically indicated coupling means well known to those skilled in the art. These means comprise a spur wheel 23 mounted on a short tube 22 secured to the disc 2. This spur wheel gears with a pinion 24 with which is connected the transmitter or receiver 25 of an electric synchronizing device. The support 19 of the projector 20 carries on the short tube 26 a spur wheel 27 gearing with the pinion 28 with which is connected the receiver or transmitter 29 of the synchronizing device.

The apparatus 25 and 29 are connected with each other by an electric system 30 of, for instance, three lines.

The tipping motion of the projector 20 is transmitted to the spur wheel 34 by a spur wheel 31, rack 32 and a rod 33 axially disposed in the tube 26 and provided at its bottom end with a rack 34 designed in the manner of a thrust journal. The spur wheel 35 is coupled with the transmitter or receiver 36 of a second synchronizing device. The tipping motion of the arm 5 is in a similar manner transmitted to the spur wheel 41 by the toothed quadrant 37, the rack 38 and the rod 39 guided in the axis of the tube 22 and provided at its free end with a rack designed in the manner of a thrust journal. The spur wheel 41 is connected with the transmitter or receiver 42 of the synchronizing mechanism which by the line 43 is connected with the apparatus 36.

The arm 5 with its extension 5$^b$ may be the steering or control member of the searchlight. In this case the apparatus 25 and 42 are transmitters and the apparatus 29 and 36 receivers.

If I omit the bow 11 with the sleeve 13, in which case the parts 5$^c$, 5$^d$ and 18 may also be omitted, and if I also eliminate the parts 5$^a$, 5$^b$ and 14 so that I retain a pointer 5 only with the guide member 12 and the guiding edge F1 then the movement must be transmitted to the pointer. The apparatus 29, 36 then are the transmitters and the apparatus 25 and 42 the receivers of the synchronizing device.

If I provide a certain amount of clearance for the shaft 5$^d$ within the sleeve 13, and also for the claw 14 on the bow 12, I am able to move the beam of light by small amounts transversely to that plane which the beam would describe if there were no play between the said parts. In this way I am able to control a broader stripe in the sky without the necessity of increasing the dispersion of the beam. If I employ the pointer 5 only together with the guiding-body 12 this transverse deflection of the beam is possible without making any special provisions.

It will be understood that changes and modifications in the structures may be made without departing from the spirit of my invention or the ambit of the appended claims.

I claim as my invention:

1. In combination with a searchlight comprising a projector, a support upon which said projector is mounted rotatable around a horizontal axis and a base-body upon which said support is mounted rotatable around a vertical axis, a device comprising a base-plate, a disc and an arm journaled upon said disc, said base-plate, disc and arm arranged in a cross-link-system, a ring mounted on said base-plate, a guiding-body adapted to cooperate with said arm and journaled upon said ring, said base-plate, ring and guiding-body arranged in a second cross-link-system the center and slewing axis of which coincide with the center and slewing axis of said first named cross-link-system, said guiding-body having at that part with which it cooperates with said arm a guiding-face which is a zone of a rotation surface the axis of rotation of which stands at right angles to the tipping axis of said guiding-body at the center of the two cross-link-systems, means for fixing said guiding-body on said ring and for fixing said ring on the base-plate, and coupling means located between said projector and said arm (between said support and said disc) and adapted to obtain equality of the tipping angles of said projector and said arm as well as equality of the slewing angles of said support and said disc.

2. In combination with a searchlight comprising a projector, a support upon which said projector is mounted rotatable around a horizontal axis and a base-body upon which said support is mounted rotatable around a vertical axis, a device comprising a base-plate, a disc and a pointer journaled upon said disc, said base-plate, disc and pointer arranged in a cross-link-system, a ring mounted on said base-plate, a ruler adapted to guide said pointer and journaled upon said ring, said base-plate, ring and guiding-ruler arranged in a second cross-link-system the center and slewing axis of which coincide with the center and slewing axis of said first named cross-link-system, said guiding-ruler having at that part with which it cooperates with said pointer a circularly curved edge the axis of rotation of which stands at right angles to the tipping axis of said guiding-body at the center of the two cross-link-systems, means for fixing said guiding-body on said ring and for fixing said ring on the base-plate, and coupling means located between said projector and said pointer (between said support and said disc) and adapted to obtain equality of the tipping angles of said projector and said pointer as well as equality of the slewing angles of said support and said disc.

In testimony whereof I affix my signature.

FRIEDRICH KALKNER.